United States Patent
Ishikawa et al.

(10) Patent No.: US 9,097,504 B2
(45) Date of Patent: Aug. 4, 2015

(54) SHAPE MEASURING MACHINE AND METHOD OF CORRECTING SHAPE MEASUREMENT ERROR

(71) Applicant: MITUTOYO CORPORATION, Kanagawa (JP)

(72) Inventors: Nobuhiro Ishikawa, Ibaraki (JP); Hideyuki Nakagawa, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 153 days.

(21) Appl. No.: 14/066,804

(22) Filed: Oct. 30, 2013

(65) Prior Publication Data

US 2014/0130362 A1 May 15, 2014

(30) Foreign Application Priority Data

Nov. 14, 2012 (JP) ................................. 2012-250077

(51) Int. Cl.
*G01B 5/008* (2006.01)
*G01B 21/04* (2006.01)

(52) U.S. Cl.
CPC .............. *G01B 5/008* (2013.01); *G01B 21/045* (2013.01)

(58) Field of Classification Search
CPC ......... G01B 5/008; G01B 5/28; G01B 21/045
USPC .......................................................... 33/503
See application file for complete search history.

(56) References Cited

U.S. PATENT DOCUMENTS

| | | | | |
|---|---|---|---|---|
| 5,189,806 A | * | 3/1993 | McMurtry et al. | 33/503 |
| 5,657,549 A | * | 8/1997 | Shen et al. | 33/503 |
| 7,464,481 B2 | * | 12/2008 | Ishikawa | 33/503 |
| 7,900,367 B2 | * | 3/2011 | Sutherland | 33/502 |
| 8,229,694 B2 | * | 7/2012 | Nakagawa et al. | 702/95 |
| 8,332,173 B2 | * | 12/2012 | Ishikawa | 702/95 |
| 2007/0271803 A1 | | 11/2007 | Ishikawa | |
| 2008/0065341 A1 | | 3/2008 | Ishikawa et al. | |
| 2014/0059872 A1 | * | 3/2014 | Nakagawa et al. | 33/502 |
| 2014/0249772 A1 | * | 9/2014 | Sprenger | 702/152 |

FOREIGN PATENT DOCUMENTS

JP 2007-315897 12/2007

OTHER PUBLICATIONS

U.S. Appl. No. 13/971,235 to Hideyuki Nakagawa et al., filed Aug. 20, 2013.

* cited by examiner

*Primary Examiner* — Christopher Fulton
(74) *Attorney, Agent, or Firm* — Greenblum & Bernstein, P.L.C.

(57) ABSTRACT

A shape measuring machine includes a slider that supports a scanning probe including a tip sphere. A scale unit detects a displacement of the slider. A tip sphere displacement detection unit detects a displacement of the tip sphere. A calculation unit includes a correction filter and an adder, and calculates a measurement value from the displacements of the slider and the tip sphere. The correction filter outputs a correction value that is obtained by correcting the displacement of the tip sphere detected by the tip sphere displacement detection unit based on an inverse characteristic of a frequency transfer characteristic from the scale unit to the tip sphere. The adder calculates the measurement value by adding the displacement of the slider detected by the scale unit and the correction value.

10 Claims, 9 Drawing Sheets

SHAPE MEASURING MACHINE AND METHOD OF CORRECTING SHAPE MEASUREMENT ERROR

INCORPORATION BY REFERENCE

This application is based upon and claims the benefit of priority from Japanese patent application No. 2012-250077, filed on Nov. 14, 2012, the disclosure of which is incorporated herein in its entirety by reference.

BACKGROUND OF THE INVENTION

1. Field of the Invention

The present invention relates to a shape measuring machine and a method of correcting a shape measurement error. For example, the present invention relates to a shape measuring machine such as a coordinate measuring machine and a method of correcting an error in its shape measurement.

2. Description of Related Art

These days, shape measuring means such as a coordinate measuring machine is used to inspect the machining accuracy (or processing accuracy) of a product having a 3D (three-dimensional) shape. Such a coordinate measuring machine carries out shape measurement, for example, by moving a scanning probe along a 3D shape.

For example, when measurement using a scanning probe is carried out by using a shape measuring machine such as a coordinate measuring machine, measurement errors occur due to effects caused by the movement of the slider on which the scanning probe is mounted. For example, when a circle is measured by using a scanning probe, motion errors called "quadrant projections" occur. The quadrant projection is a projection-shaped motion error that occurs when the quadrant of the mechanical orthogonal coordinate system of the measuring machine is changed (when the motion direction on each axis is reversed) in the circular motion of the scanning probe. Further, due to this quadrant projection, a projection-shaped measurement error occurs. The quadrant projection is mainly caused by a backlash and the like resulting from the mechanical structure of the measuring machine.

FIG. 9 shows a measurement result that is obtained by measuring the shape of a ring gage (ring-shaped object to be measured) by using a typical coordinate measuring machine. As shown in FIG. 9, a projection measurement error is observed in the boundary area P1 between the fourth quadrant and the first quadrant and in the boundary area P2 between the second quadrant and the third quadrant in the measurement waveform. They are errors resulting from quadrant projections caused by backlashes and the like that occur when the motion of the scanning probe in the X-axis direction is reversed.

Further, Japanese Unexamined Patent Application Publication No. 2007-315897 discloses an example of a method of correcting an error in measurement using a scanning probe. According to this technique, the position of the tip of the slider is estimated by using a correction filter based on the frequency transfer characteristic between the scale and the slider tip. Then, a measurement value is calculated by adding the estimated value and a scanning-probe detection value, so that the measurement error resulting from the quadrant projection can be corrected.

SUMMARY OF THE INVENTION

However, the inventors have found that there is the following problem in the above-described technique. The above-described technique disclosed in Japanese Unexamined Patent Application Publication No. 2007-315897 can eliminate the measurement error resulting from the frequency transfer characteristic between the scale unit, which detects the displacement amount of the probe through the slider of the coordinate measuring machine, and the tip of the slider. However, depending of the type of the probe used in the scanning measurement, a relative displacement between the position of the tip of the slider and the reference position of the tip sphere of the scanning probe could occur. Note that the reference position of the tip sphere of the scanning probe is the position of the tip sphere when the tip sphere is not in contact with the object to be measured. The relative displacement like this becomes noticeable when the response of the scanning probe is poor and thus the reference position of the tip sphere of the scanning probe cannot follow the movement of the position of the slider tip. When such a relative displacement occurs, the above-described technique cannot eliminate the measurement error resulting from the frequency transfer characteristic from the tip of the slider to the tip of the probe that is in contact with the object to be measured.

A shape measuring machine according to a first aspect of the present invention includes: a scanning probe that performs scanning measurement by using a tip sphere disposed at a tip of a stylus attached to one end of the scanning probe, the tip sphere being configured to come into contact with an object to be measured; a movably-disposed slider that supports the scanning probe at another end of the scanning probe opposite to the tip sphere; a scale unit that detects a displacement of the slider; a tip sphere displacement detection unit that detects a displacement of the tip sphere of the scanning probe with respect to a junction between the scanning probe and the slider; and a calculation unit that calculates a measurement value from the displacement of the slider detected by the scale unit and the displacement of the tip sphere detected by the tip sphere displacement detection unit, in which the calculation unit includes: a correction filter that outputs a correction value, the correction value being obtained by correcting the displacement of the tip sphere detected by the tip sphere displacement detection unit based on an inverse characteristic of a frequency transfer characteristic from the scale unit to the tip sphere; and an adder that calculates the measurement value by adding the displacement of the slider detected by the scale unit and the correction value.

A shape measuring machine according to a second aspect of the present invention is the above-described shape measuring machine, in which the correction filter outputs the correction value, the correction value being obtained by correcting the displacement of the tip sphere detected by the tip sphere displacement detection unit based on an estimated value of the inverse characteristic of the frequency transfer characteristic from the scale unit to the tip sphere.

A shape measuring machine according to a third aspect of the present invention is the above-described shape measuring machine, in which the correction filter includes: a first filter that corrects the displacement of the tip sphere detected by the tip sphere displacement detection unit based on an estimated value of an inverse characteristic of a frequency transfer characteristic from the scale unit to the junction between the scanning probe and the slider; a second filter that corrects a value corrected by the first filter based on an estimated value of an inverse characteristic of a frequency transfer characteristic from the junction between the scanning probe and the slider to a stylus attachment part of the scanning probe; and a third filter that outputs a value as the correction value, the value being obtained by correcting a value corrected by the second filter based on an estimated value of an inverse characteristic of a frequency transfer characteristic from the stylus attachment part of the scanning probe to the tip sphere.

A shape measuring machine according to a fourth aspect of the present invention is the above-described shape measuring machine, in which an estimated value of an inverse characteristic of a frequency transfer characteristic is calculated as a transfer function based on an actual measurement value of a frequency transfer characteristic or an inverse frequency transfer characteristic.

A shape measuring machine according to a fifth aspect of the present invention is the above-described shape measuring machine, further including a filter that removes an unnecessary frequency component contained in the correction value or the measurement value.

A method of correcting a shape measurement error according to a sixth aspect of the present invention includes: detecting, by a scale unit, a displacement of a movably-disposed slider, the slider supporting a scanning probe that performs scanning measurement by using a tip sphere disposed at a tip of a stylus attached to one end of the scanning probe, the slider supporting the scanning probe at another end of the scanning probe opposite to the tip sphere, the tip sphere being configured to come into contact with an object to be measured; detecting a displacement of the tip sphere of the scanning probe with respect to a junction between the scanning probe and the slider; outputting a correction value, the correction value being obtained by correcting the detected displacement of the tip sphere based on an inverse characteristic of a frequency transfer characteristic from the scale unit to the tip sphere; and calculating a measurement value by adding the displacement of the slider detected by the scale unit and the correction value.

A method of correcting a shape measurement error according to a seventh aspect of the present invention is the above-described method of correcting a shape measurement error, in which the correction value is output, the correction value being obtained by correcting the detected displacement of the tip sphere based on an estimated value of the inverse characteristic of the frequency transfer characteristic from the scale unit to the tip sphere.

A method of correcting a shape measurement error according to an eighth aspect of the present invention further includes: calculating a first value by correcting the detected displacement of the tip sphere based on an estimated value of an inverse characteristic of a frequency transfer characteristic from the scale unit to the junction between the scanning probe and the slider; calculating a second value by correcting the first value based on an estimated value of an inverse characteristic of a frequency transfer characteristic from the junction between the scanning probe and the slider to a stylus attachment part of the scanning probe; and calculating the correction value by correcting the second value based on an estimated value of an inverse characteristic of a frequency transfer characteristic from the stylus attachment part of the scanning probe to the tip sphere.

A method of correcting a shape measurement error according to a ninth aspect of the present invention is the above-described method of correcting a shape measurement error, in which an estimated value of an inverse characteristic of a frequency transfer characteristic is calculated as a transfer function based on an actual measurement value of a frequency transfer characteristic or an inverse frequency transfer characteristic.

A method of correcting a shape measurement error according to a tenth aspect of the present invention is the above-described method of correcting a shape measurement error, further including performing a filtering process for removing an unnecessary frequency component contained in the correction value or the measurement value.

According to the present invention, it is possible to reduce measurement errors in a shape measuring machine more effectively.

The above and other objects, features and advantages of the present invention will become more fully understood from the detailed description given hereinafter and the accompanying drawings which are given by way of illustration only, and thus are not to be considered as limiting the present invention.

DESCRIPTION OF THE EXEMPLARY EMBODIMENTS

Exemplary embodiments according to the present invention are explained hereinafter with reference to the drawings. The same symbols are assigned to the same components throughout the drawings, and their duplicated explanation is omitted as appropriate.

First Exemplary Embodiment

Figure 1:
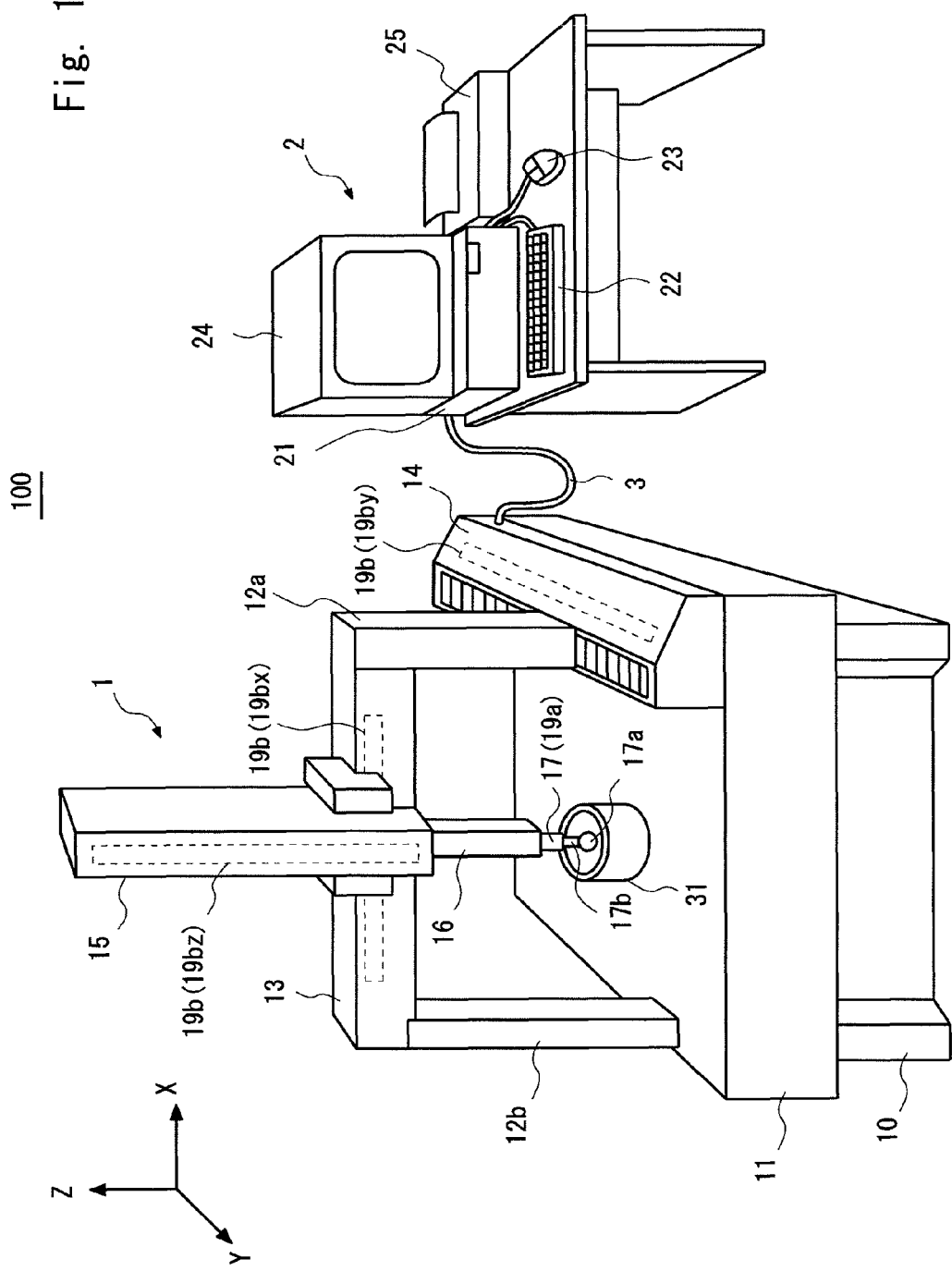
FIG. 1 is a perspective view schematically showing a configuration of a shape measuring machine 100 according to a first exemplary embodiment.

Firstly, a shape measuring machine 100 according to a first exemplary embodiment is explained. FIG. 1 is a perspective view schematically showing a configuration of a shape measuring machine 100 according to a first exemplary embodiment. The shape measuring machine 100 includes a coordinate measuring machine 1 and a computer 2. The coordinate measuring machine 1 is connected to the computer 2 through a cable 3.

The coordinate measuring machine 1 is configured as shown in FIG. 1, for example, in which a surface plate 11 is mounted on a vibration damping pedestal 10 in such a manner that the upper surface (base surface) of the surface plate 11 coincides with the horizontal plane (XY-plane in FIG. 1). A Y-axis driving mechanism 14 that extends in the Y-direction is disposed at one end of the surface plate 11 in the X-direction. A beam support 12a is disposed in a standing position on the Y-axis driving mechanism 14. In this manner, the Y-axis driving mechanism 14 can drive the beam support 12a in the Y-direction. A beam support 12b is disposed in a standing position on the other end of the surface plate 11 in the X-direction. The bottom end of the beam support 12b is supported by an air-bearing so that the beam support 12b can move in the Y-axis direction. A beam 13 that extends in the X-axis direction is supported at both ends by the beam supports 12a and 12b respectively, and supports a column 15 that extends vertically (in the Z-axis direction). The column 15 is driven in the X-axis direction along the beam 13. A slider 16 is disposed in the column 15 in such a manner that the slider 16 can be driven in the Z-axis direction along the column 15. A scanning probe 17 is attached to the bottom end of the slider 16. Further, a stylus 17b is removably attached to the stylus attachment part of the scanning probe 17. A spherical tip sphere 17a, for example, is disposed at the tip of the stylus 17b.

The tip sphere 17a comes into contact with an object to be measured 31 placed on the surface plate 11 and thereby is pushed away from its reference position (neutral position) by a predetermined pushed amount. A tip sphere displacement detection unit 19a disposed inside the scanning probe 17 outputs an amount of the push (in each of the X, Y and Z axis directions), and the computer 2 takes in the XYZ-coordinate value(s) (amount of shift from the reference position) of the tip sphere 17a in that state.

The computer 2 takes in necessary measurement values by driving and controlling the coordinate measuring machine 1, and performs necessary calculation processing for calculating the surface property of the object to be measured. The computer 2 includes a computer main body 21, a keyboard 22, a mouse 23, a CRT 24, and a printer 25. A typical keyboard, a mouse, a CRT, and a printer can be used as the keyboard 22, the mouse 23, the CRT 24, and the printer 25 respectively, and therefore their detailed explanations are omitted here. Details of the computer main body 21 will be explained later.

Figure 2:
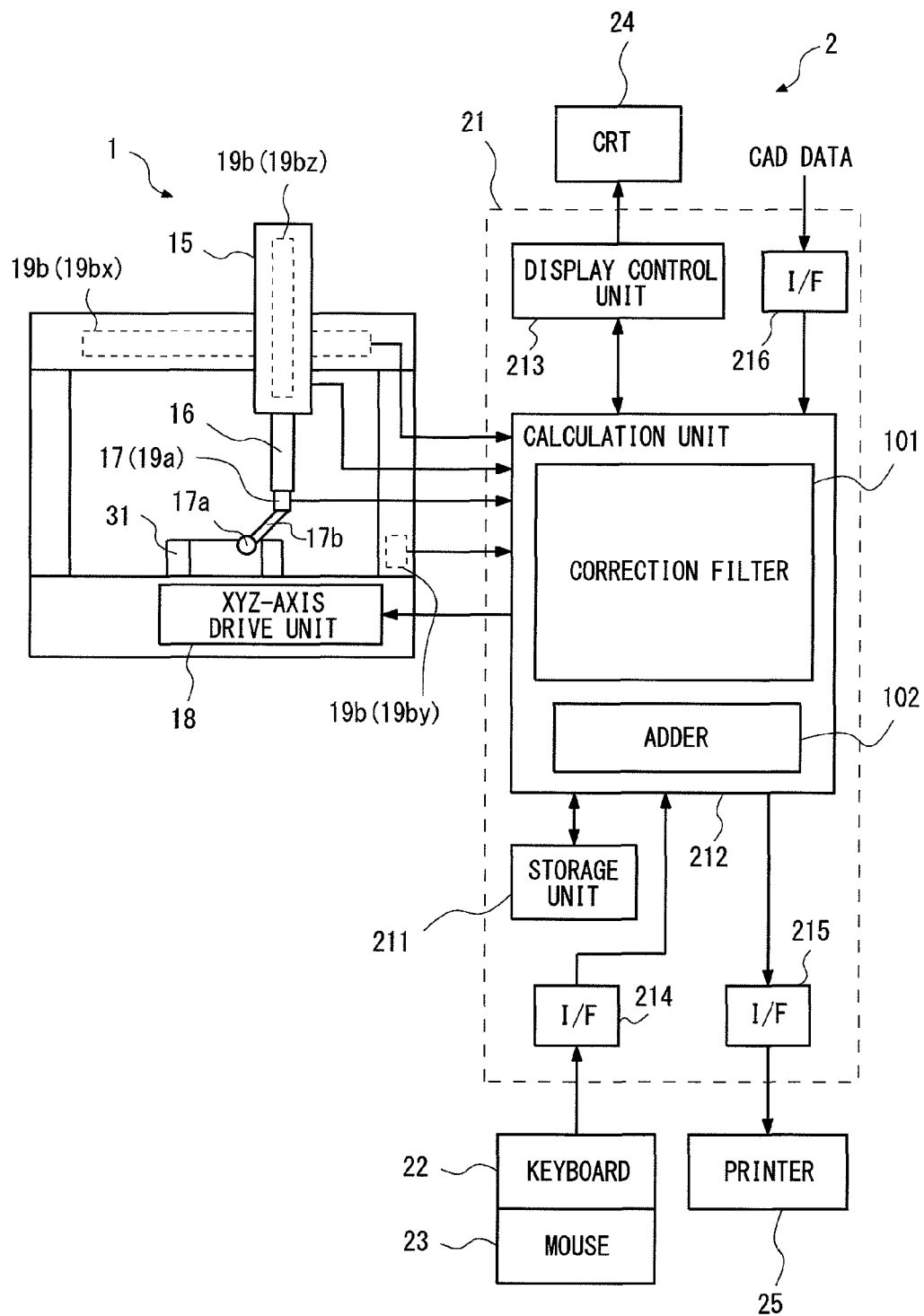
FIG. 2 is a functional block diagram of a shape measuring machine 100 according to a first exemplary embodiment.

Next, a functional configuration of the shape measuring machine 100 is explained with reference to FIG. 2. FIG. 2 is a functional block diagram of the shape measuring machine 100 according to the first exemplary embodiment. The coordinate measuring machine 1 includes an XYZ-axis drive unit 18 and a scale unit 19b. The XYZ-axis drive unit 18 drives the scanning probe 17 in the XYZ-axis directions. As the scale unit 19b moves in the XYZ-axis directions, the scale unit 19b outputs movement pulses for each axis direction of the slider 16.

The scale unit 19b includes an X-axis scale unit 19bx, a Y-axis scale unit 19by, and a Z-axis scale unit 19bz. The X-axis scale unit 19bx is disposed in the beam 13 and detects a displacement of the column 15 in the X-axis direction. The Y-axis scale unit 19by is disposed near the Y-axis driving mechanism 14 and detects a displacement of the beam support 12a in the Y-axis direction. The Z-axis scale unit 19bz is disposed in the column 15 and detects a displacement of the slider 16 in the Z-axis direction. The detected displacement information of the tip sphere 17a (amount of shift on each of the XYZ-axes output from the tip sphere displacement detection unit 19a) and the detected displacement information of the slider 16 (amount of shift on each of the XYZ-axes output from the scale unit 19b) are output to a calculation unit 212 (which is described later). Note that the scale unit 19b is adjusted in advance so that the scale unit 19b outputs the reference position of the tip sphere 17a in a state where no relative displacement occurs between the scale unit 19b and the reference position of the tip sphere 17a.

The computer main body 21 of the computer 2 includes, as a main component, an HDD, a semiconductor memory, or the like. The computer main body 21 includes a storage unit 211, a calculation unit 212, a display control unit 213, and I/Fs (interfaces) 214 to 216. The storage unit 211 stores entered information. The calculation unit 212 includes a CPU or the like, and drives the coordinate measuring machine 1 and calculates measurement values. The display control unit 213 controls images to be displayed in the CRT 24. Note that the storage unit 211 also stores a surface property measurement program for driving the coordinate measuring machine 1, detection values detected by its measurement, design values of an object(s) to be measured, and so on. The calculation unit 212 reads the surface property measurement program from the storage unit 211 and measures the shape of an object to be measured.

The calculation unit 212 receives instruction information by an operator that is entered from the keyboard 22 and the mouse 23 through the I/F (interface) 214. Further, the calculation unit 212 takes in detected tip sphere displacement information and slider displacement information. The calculation unit 212 moves the slider 16 by using the XYZ-axis drive unit 18, detects measurement values of the object to be measured 31, and performs various processes such as a process for correcting a measurement value based on the above-described input information, the instruction information by the operator, and the program stored in the storage unit 211. The calculation unit 212 outputs measurement values calculated through various processes to the printer 25 through the I/F (interface) 215. Note that the I/F (interface) 216 is used to convert CAD data of the object to be measured 31 provided by an external CAD system or the like (not shown) into a predetermined format and to supply the converted CAD data to the computer main body 21.

Figure 3:
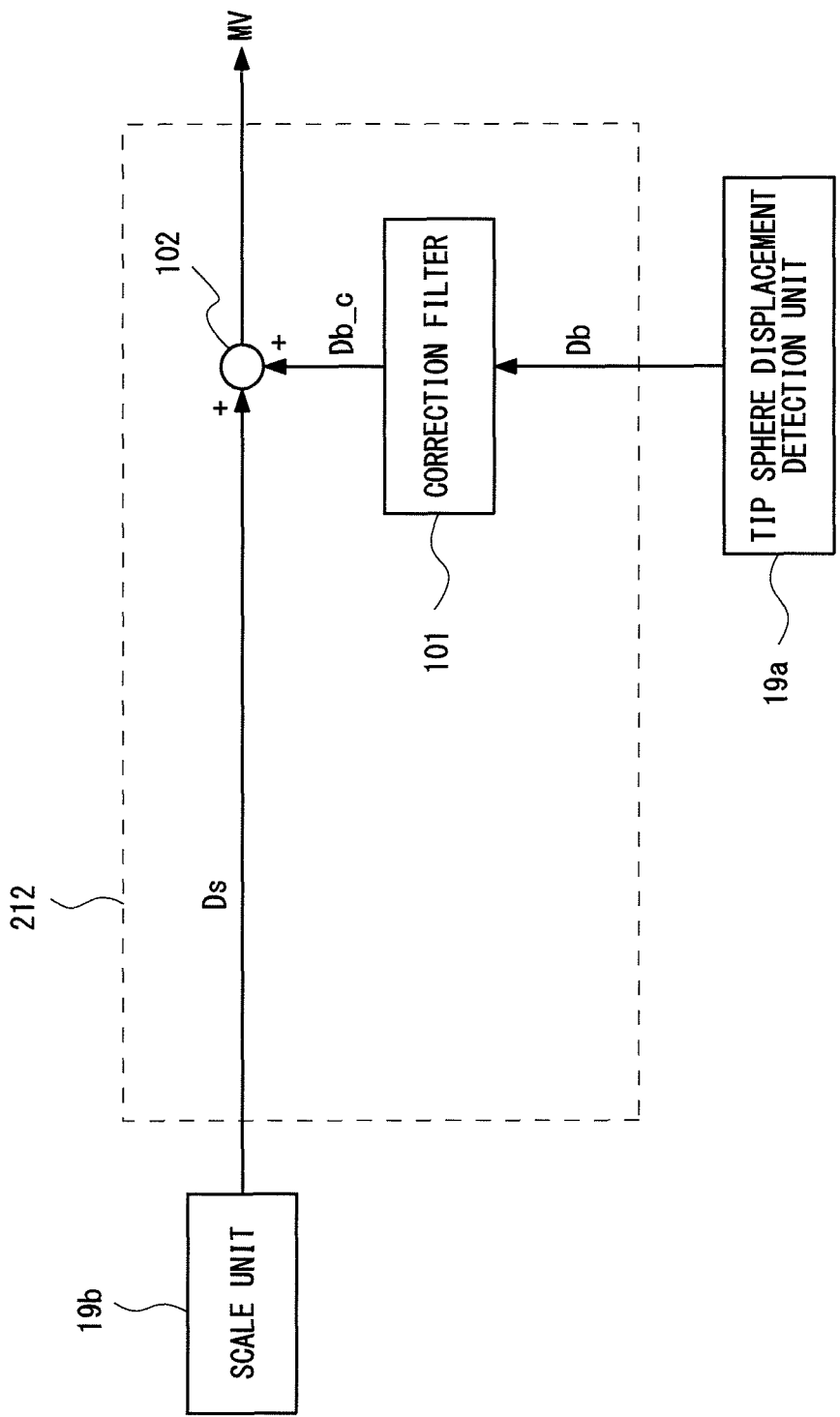
FIG. 3 is a control block diagram of a calculation unit 212 and its peripheral devices.
Figure 4:
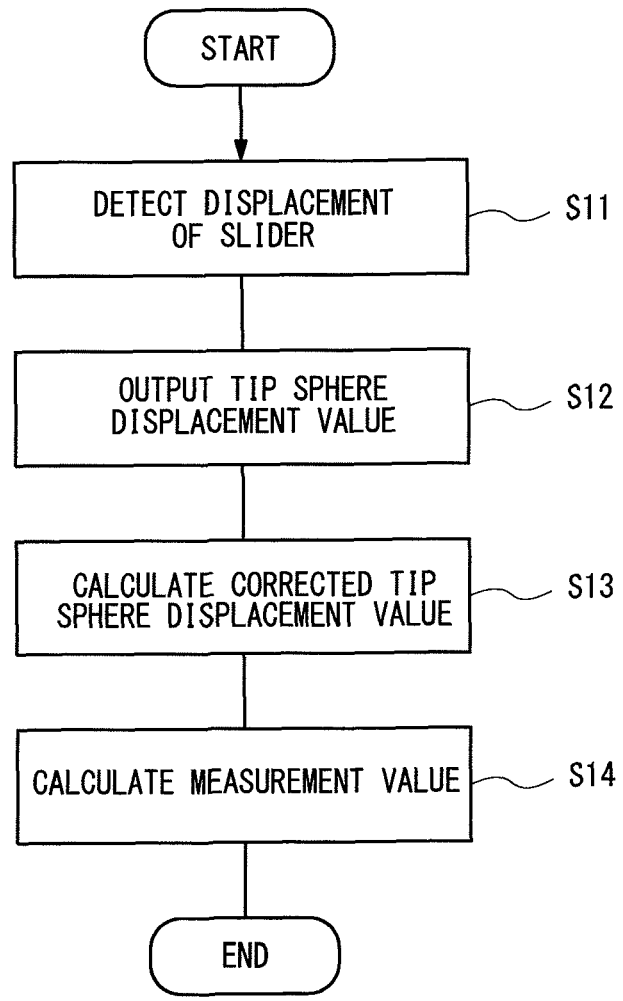
FIG. 4 is a flowchart showing a measurement value calculation process performed by a calculation unit 212.

Next, a functional configuration of the calculation unit 212, which calculates a measurement value of an object to be measured 31, and a process for calculating a measurement value are explained with reference to FIGS. 3 and 4. FIG. 3 is a control block diagram of the calculation unit 212 and its peripheral devices. FIG. 4 is a flowchart showing a measurement value calculation process performed by the calculation unit 212. The calculation unit 212 includes a correction filter 101 and an adder 102.

(Step S11)

Firstly, the scale unit 19b detects a displacement Ds of the slider 16 and outputs the detected displacement Ds to the adder 102 of the calculation unit 212. The calculation unit 212 includes the correction filter 101.

(Step S12)

The tip sphere displacement detection unit 19a detects a tip sphere displacement value Db indicating the displacement of the tip sphere 17a with respect to the tip of the slider 16 (i.e., an amount of a shift of the tip sphere 17a from the reference position) and outputs the detected tip sphere displacement value Db to the correction filter 101.

(Step S13)

The correction filter 101 calculates a corrected tip sphere displacement value Db_c in which the error of the tip sphere 17a in the measurement space is corrected, based on the tip sphere displacement value Db. For example, the correction filter 101 uses an estimated value Geb1(s) that is defined so as to approximate an inverse characteristic of a frequency transfer characteristic from the scale unit 19b to the tip sphere 17a as a correction value for the tip sphere displacement value Db. For example, the estimated value Geb1(s) is Expression (1) shown below.

[Expression 1]

$$Geb1 = \frac{\omega_P^2(s^2 + 2\xi_Z\omega_Z s + \omega_Z^2)}{\omega_Z^2(s^2 + 2\xi_P\omega_P s + \omega_P^2)} \quad (1)$$

In the expression, $\omega_Z$ is an angular frequency at the zero; $\omega_P$ is an angular frequency at the pole; $\xi_Z$ is an attenuation factor at the zero; and $\xi_P$ is an attenuation factor at the pole. Note that the zero indicates the value of the variable s when the estimated value Geb1(s) is zero. The pole indicates the value of the variable s when the estimated value Geb1(s) is infinity.

(Step S14)

The adder 102 calculates a measurement value MV by adding the displacement Ds of the slider 16 and the corrected tip sphere displacement value Db_c, and outputs the calculated measurement value MV.

The tip sphere displacement detection unit 19a is mounted at the tip of the slider 16. Therefore, the tip sphere displacement value Db is a value in which an error (first error) due to the frequency transfer characteristic from the tip of the slider 16 to the tip sphere 17a and an error (second error) due to the frequency transfer characteristic from the scale unit 19b to the tip of the slider 16 affect the true position of the tip sphere.

That is, the correction filter 101 performs calculation for correcting the aforementioned first and second errors contained in the tip sphere displacement value Db. Therefore, the corrected tip sphere displacement value Db_c is a value from which the first and second errors are removed.

Further, the inverse characteristic of the frequency transfer characteristic from the scale unit 19b to the tip sphere 17a can be approximated by a first-order lead characteristic, a second-order lead characteristic, or a characteristic obtained by multiplying these characteristics. Therefore, the correction filter does not limit the frequency band. However, a high-frequency noise component(s) of the scanning probe detection value may be amplified by the correction filter. Therefore, after the correction filter is applied to the scanning probe detection value or the addition process is performed by the adder 102, a filtering process may be performed to remove an unnecessary frequency component(s).

Figure 5:
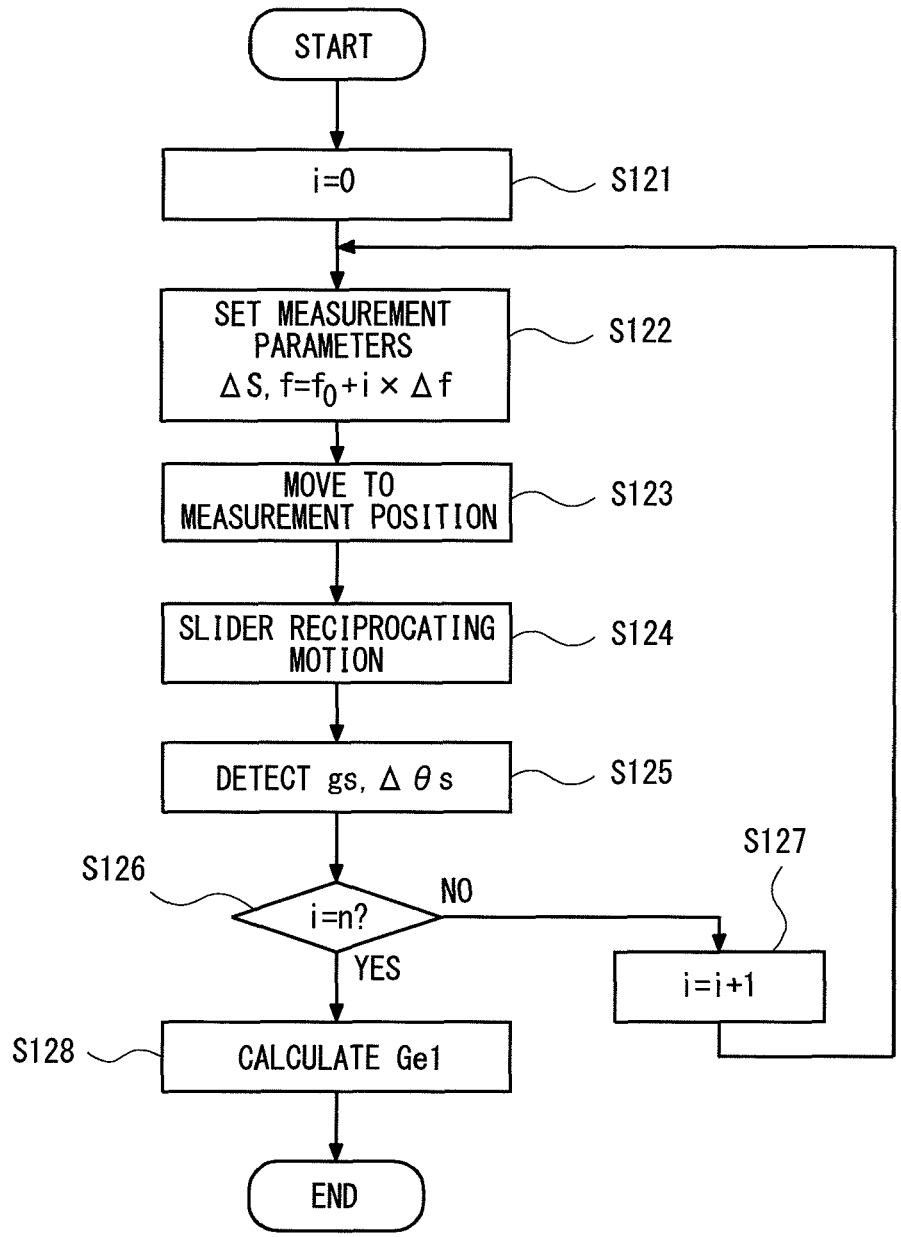
FIG. 5 is a flowchart showing a frequency transfer characteristic setting method in a correction filter 101.

Next, a method of setting a frequency transfer characteristic in the correction filter 101 is explained. FIG. 5 is a flowchart showing a method of setting a frequency transfer characteristic in the correction filter 101. Firstly, a scanning probe for which a frequency transfer characteristic is to be measured is attached to the slider 16. The frequency transfer characteristic to be corrected by the correction filter 101 changes depending on the type of the scanning probe attached to the slider 16. Therefore, it is necessary to perform measurement for each type of scanning probe separately and thereby to obtain a frequency transfer characteristic for each type of scanning probe. Then, an object to be measured such as a gage block is placed on the surface plate 11 of the coordinate measuring machine 1. In this process, the object to be measured is disposed so that the surface direction of the object to be measured coincides with the X, Y and Z axis directions of the coordinate measuring machine. Through these processes, the preparation for obtaining frequency transfer characteristics has been completed.

(Step S121)

A count value i is set to an initial value. The count value i is an integer satisfying a relation 0≤i≤n (n is a positive integer).

(Step S122)

Then, measurement parameters are set. In this process, an amplitude ΔS and a frequency f of the reciprocating motion of the slider 16 are set as measurement parameters. In this process, the frequency f is expressed by, for example, Expression (2) shown below.

$$f = f_0 + i \times \Delta f \quad \text{[Expression 2]}$$

(Step S123)

Then, the scanning probe 17 is moved in the Y-axis direction to a measurement position. As a result, the tip sphere 17a of the scanning probe 17 is brought into contact with the object to be measured in such a manner that the tip sphere 17a is pushed into the XZ-surface of the object to be measured by a predetermined amount (the tip sphere 17a is shifted in the Y-axis direction by a predetermined amount).

(Step S124)

After that, an instruction is provided to the Y-axis driving mechanism 14 so that the slider 16 of the coordinate measuring machine 1 performs reciprocating motion in the Y-axis direction for a predetermined period. In this process, the slider 16 is preferably made to perform reciprocating motion in such a manner that its displacement in the Y-axis direction changes in a sine-wave pattern.

(Step S125)

Then, the Y-axis shift amount output from the tip sphere displacement detection unit 19a is compared with the reciprocating motion of the scale unit 19b. The gain gs and the phase Δθs with respect to the Y-axis shift amount of the amplitude ΔS of the scale unit 19b are detected.

(Step S126)

It is determined whether or not the count value i is equal to n (i.e., i=n).

(Step S127)

When the count value i is not equal to n (i.e., i≠n), the count value is incremented by one and the process returns to the step S122. That is, the steps S122 to S126 constitutes a loop process. In this way, it is possible to obtain the inverse characteristic of the frequency transfer characteristic from the scale unit 19b to the tip of the slider 16.

(Step S128)

When the count value i is equal to n (i.e., i=n), an approximate function is obtained from actual measurement values of the inverse characteristic of the frequency transfer characteristic. In this way, it is possible to obtain the estimated value Geb1 of the inverse characteristic of the frequency transfer characteristic from the scale unit 19b to the tip sphere 17a (i.e., the above-shown Expression (1)). Note that the estimated value Geb1 of the inverse characteristic of the frequency transfer characteristic from the scale unit 19b to the tip sphere 17a may be obtained by first obtaining the estimated value of the frequency transfer characteristic (frequency transfer function) from the the scale unit 19b to the tip sphere 17a and then by replacing the denominator and the numerator with each other.

Although the frequency transfer characteristic in the Y-axis direction is explained in the above-described example, inverse characteristics of frequency transfer characteristics on the X-axis and on the Z-axis can be also obtained by using a similar process to that shown in FIG. 5. Note that the inverse characteristic of the frequency transfer characteristic from the Y-axis scale unit 19by to the tip sphere 17a, the inverse characteristic of the frequency transfer characteristic from the X-axis scale unit 19bx to the tip sphere 17a, and the inverse characteristic of the frequency transfer characteristic from the Z-axis scale unit 19bz to the tip sphere 17a do not necessarily coincide with one another. Therefore, they usually produce different transfer functions.

Further, the transfer function may change depending on, for example, the positions of the beam supports 12a and 12b of the coordinate measuring machine 1 (e.g., whether they are located in the front, the center, or the rear in FIG. 1). In such cases, it is possible to improve the accuracy of the correction filter 101 even further by obtaining a transfer function for each of the predetermined positions of the slider 16 in the X, Y and Z axis directions in advance and by using a transfer function corresponding to the slider position in the X, Y and Z axis directions.

Further, in the above-shown example of an acquisition method for the correction filter 101, when a reciprocation command is provided to the Y-axis driving mechanism 14, only the Y-axis component is output as the output of the tip sphere displacement detection unit 19a. That is, the above-shown example is explained on the assumption that when a reciprocation command is provided to the Y-axis driving mechanism 14, the components on the other axes (X and Z axes) do not change. However, in reality, there are cases where when a reciprocation command is provided only on the Y-axis, the components on the X and Z axes also change. That is, there are cases where when the beam supports 12a and 12b are vibrated in the Y-axis direction (front/rear direction in FIG. 1), the tip sphere 17a of the scanning probe 17 is also vibrated in the X-axis or Z-axis direction. In such cases in which a vibration in a different axis direction occurs, it is possible to estimate the reference position of the tip sphere 17a with higher accuracy by obtaining a transfer function(s) based on that component(s) in advance and by using the correction filter 101. Note that when a different-axis component(s) is obtained, it is preferable, for example, to bring the tip sphere 17a of the scanning probe 17 into contact with an object to be measured so that the tip sphere 17a is pushed into the object to be measured in the Y-axis direction by a predetermined while restraining the tip sphere 17a in the X-axis direction and in the Z-axis direction. For example, the tip sphere 17a may be fixed to the surface plate 11 by using a rotary joint or the like that prevents the tip sphere 17a from moving in the X, Y and Z axis directions but allows the tip sphere 17a to rotate on the X, Y and Z axes.

By obtaining a transfer function for each axial position and a transfer function(s) based on the different-axis vibration for the slider 16 in this manner and setting these transfer functions in the correction filter 101, it is possible to obtain measurement values with higher accuracy.

Figure 6:
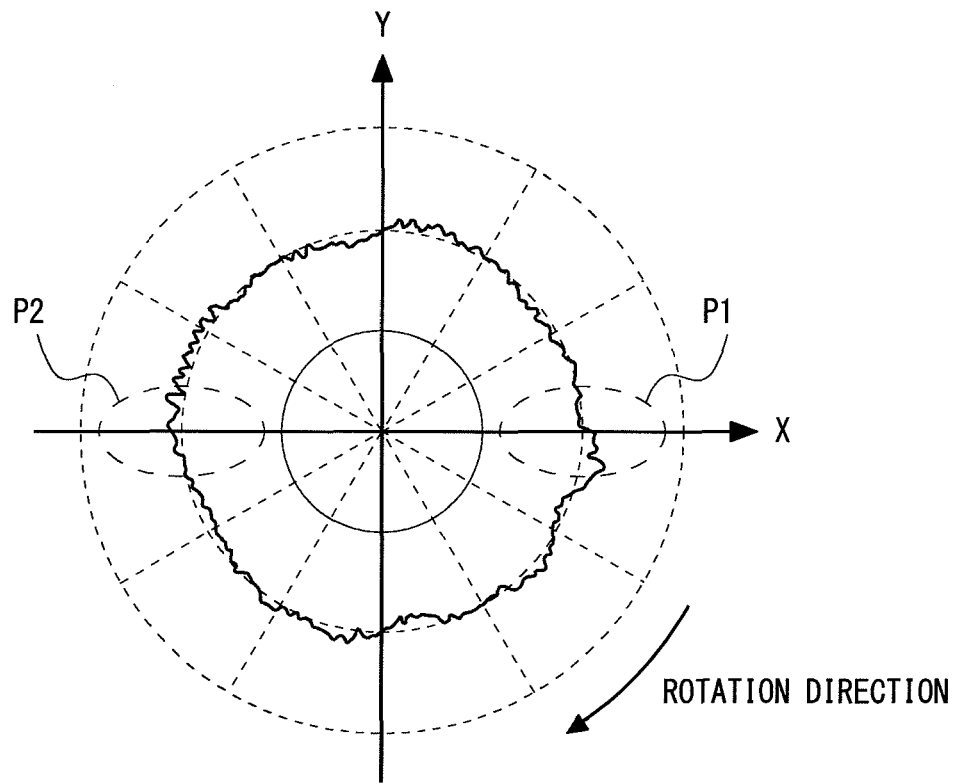
FIG. 6 shows a simulation result of measurement values of an object to be measured 31 in a case where a first exemplary embodiment is applied.
Figure 9:
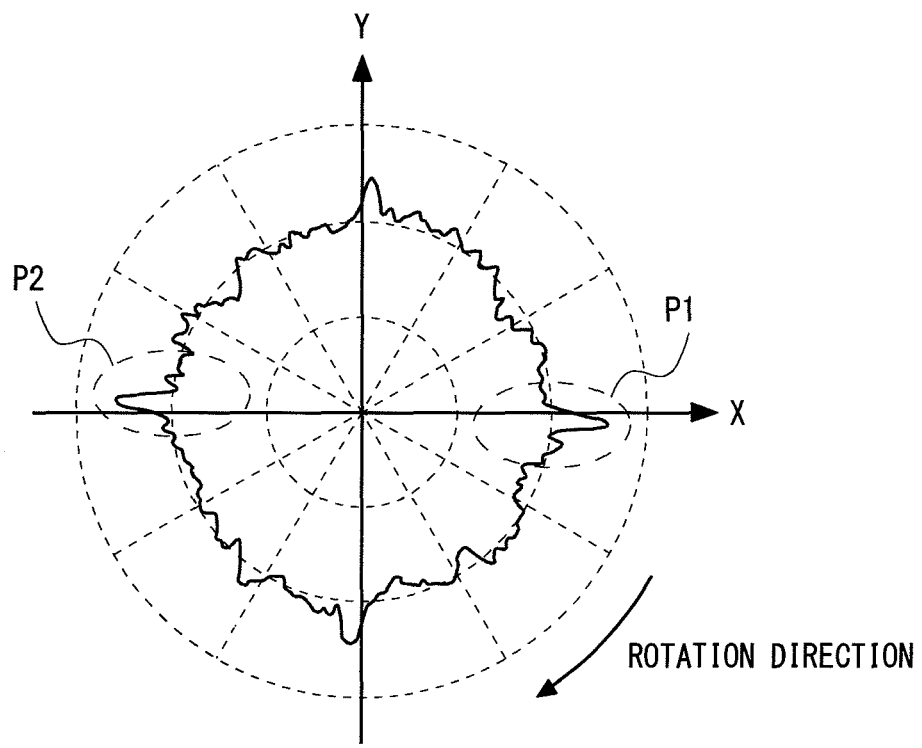
FIG. 9 shows an example of measurement of a ring gage (ring-shaped object to be measured) by using a typical coordinate measuring machine.

FIG. 6 shows a simulation result of measurement values of an object to be measured 31 in a case where the first exemplary embodiment is applied. As shown in the simulation result of measurement values according to the first exemplary embodiment shown in FIG. 6, it can be seen that, in comparison to FIG. 9, the projection-shaped measurement errors are eliminated in the boundary area P1 between the fourth quadrant and the first quadrant and in the boundary area P2 between the second quadrant and the third quadrant.

As described above, in this exemplary embodiment, the correction filter 101 in which the inverse function of the transfer function obtained from the frequency transfer characteristic (relative displacement characteristic) from the scale unit 19b to the tip sphere 17a is set is applied when measurement values are obtained. As a result, it is possible to obtain the position of the tip sphere 17a with higher accuracy. Therefore, it is possible to obtain a measurement value while cancelling out the effect caused by a quadrant projection, a lost motion, a transient phenomenon, a resonance phenomenon, and the like, and thereby to measure an object to be measured such as a ring gage with high accuracy.

Second Exemplary Embodiment

Figure 7:
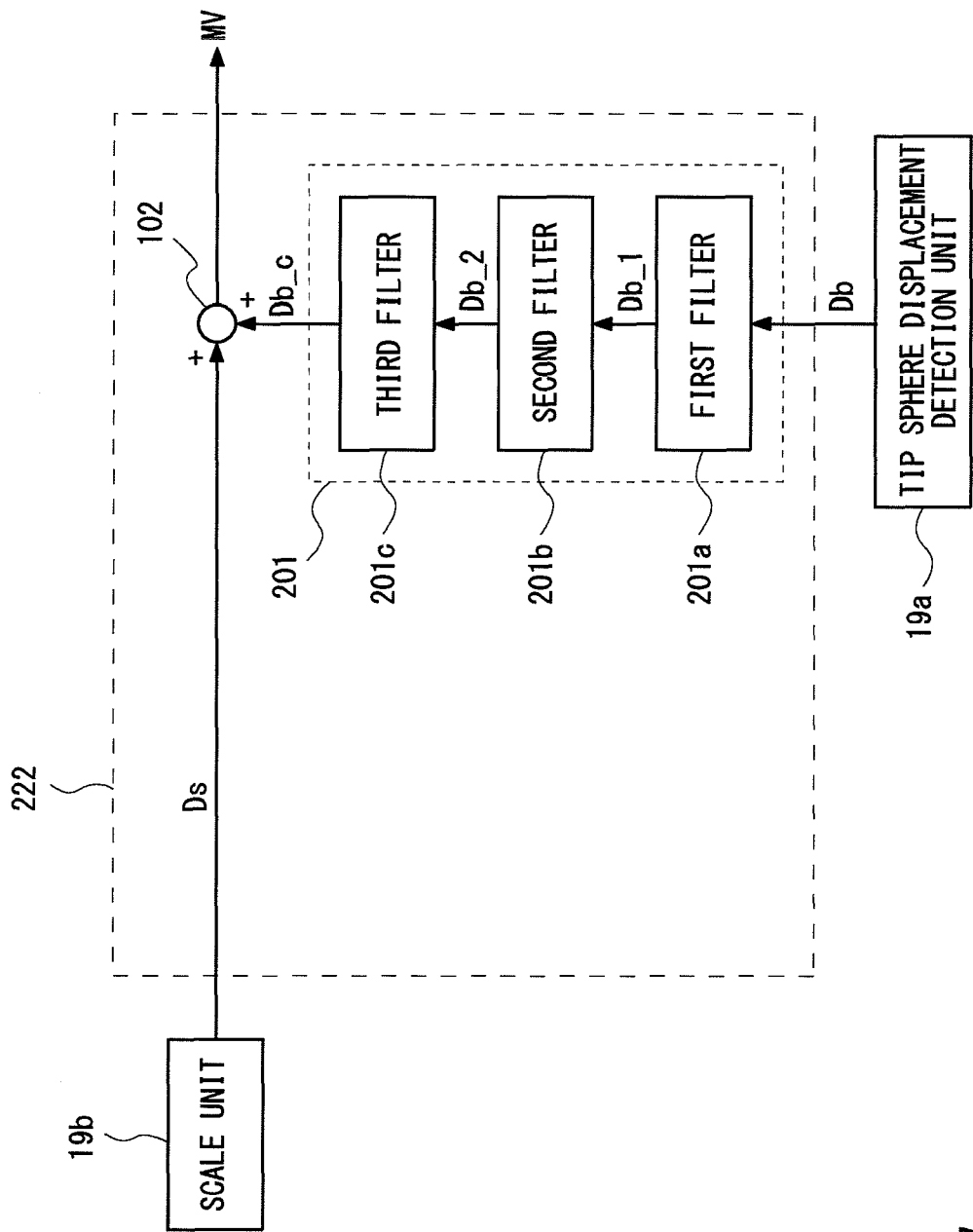
FIG. 7 is a control block diagram of a calculation unit 222 and its peripheral devices of a shape measuring machine 200 according to a second exemplary embodiment.

Next, a shape measuring machine 200 according to a second exemplary embodiment is explained. FIG. 7 is a control block diagram of the calculation unit 222 and its peripheral devices of the shape measuring machine 200 according to the second exemplary embodiment. The configuration of the shape measuring machine 200 is substantially the same as that of the shape measuring machine 100 except that the calculation unit 212 is replaced by a calculation unit 222. The calculation unit 222 includes a correction filter 201 having a similar function to that of the correction filter 101. The correction filter 201 includes a first filter 201a, a second filter 201b, and a third filter 201c. The other configuration of the shape measuring machine 200 is similar to that of the shape measuring machine 100, and therefore its explanation is omitted.

Figure 8:
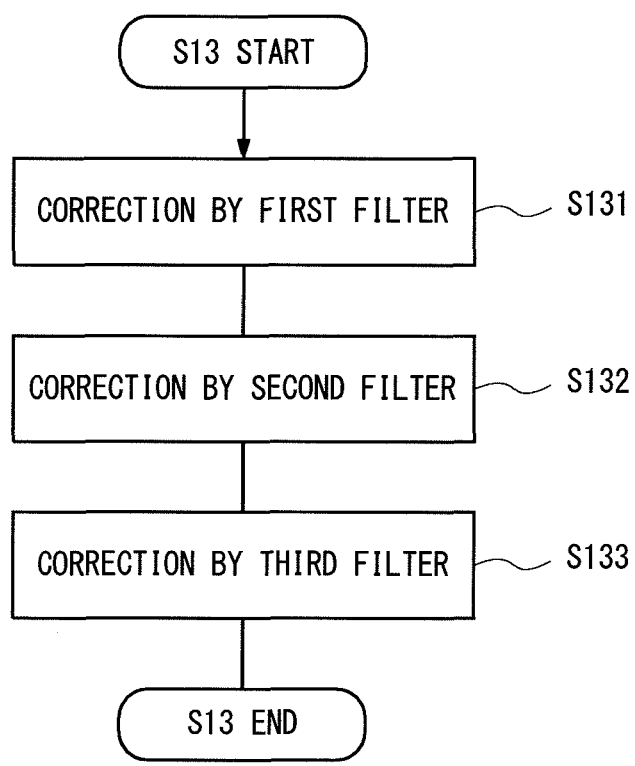
FIG. 8 is a flowchart showing a process performed by a shape measuring machine 200 in a step S13.

Next, a measurement value calculation process performed by the shape measuring machine 200 is explained. The shape measuring machine 200 performs a similar process to the measurement value calculation process performed by the shape measuring machine 100. However, in the step S13 in FIG. 4, a correction process is performed by the first, second and third filters 201a, 201b and 201c. A process performed by the shape measuring machine 200 in the step S13 is explained hereinafter. FIG. 8 is a flowchart showing a process performed by the shape measuring machine 200 in the step S13.

(Step S131: First Filtering Process)

The first filter 201a uses an estimated value Geb11(s) that is defined so as to approximate the inverse characteristic of the frequency transfer characteristic from the scale unit 19b to the tip of the slider 16 as a correction value. The first filter 201a corrects the tip sphere displacement value Db by using the estimated value Geb11(s), and outputs the corrected value as a first correction value Db_1.

(Step S132: Second Filtering Process)

The second filter 201b uses an estimated value Geb12(s) that is defined so as to approximate the inverse characteristic of the frequency transfer characteristic from the tip of the slider 16 to the stylus attachment part as a correction value. The second filter 201b corrects the first correction value Db_1 by using the estimated value Geb12(s), and outputs the corrected value as a second correction value Db_2.

(Step S133: Third Filtering Process)

The third filter 201c uses an estimated value Geb13(s) that is defined so as to approximate the inverse characteristic of the frequency transfer characteristic from the stylus attachment part to the tip sphere 17a as a correction value. The third filter 201c corrects the second correction value Db_2 by using the estimated value Geb13(s), and outputs the corrected value as a corrected tip sphere displacement value Db_c.

By the above-described first to third filters 201a to 201c, the tip sphere displacement value can be corrected by using frequency transfer functions representing the inverse characteristics of the frequency transfer characteristics from the scale unit 19b to the tip sphere 17a. That is, the estimated value Geb1(s) explained in the first exemplary embodiment is expressed by Expression (3) shown below.

[Expression 3]

$$Geb1 = Geb11 \cdot Geb12 \cdot Geb13 \quad (3)$$

Next, a method of setting frequency transfer characteristics in the first to third filters 201a to 201c is explained. Each of the first to third filters 201a to 201c can obtain a frequency transfer characteristic by using a similar method to that shown in FIG. 5.

For the first filter 201a, for example, the inverse characteristic of the frequency transfer characteristic from the scale unit 19b to the tip of the slider 16 can be obtained by attaching a scanning probe having a sufficiently high response and performing the above-described repetitive operation.

For the second and third filters 201b and 201c, for example, the inverse characteristic of the frequency transfer characteristic may be obtained for each type of probe and stylus as required.

As described above, the position of the tip sphere 17a can be accurately determined according to this configuration as in the case of the shape measuring machine 100. Therefore, it is possible to obtain a measurement value while eliminating the effect caused by a quadrant projection, a lost motion, a transient phenomenon, a resonance phenomenon, and the like, and thereby to measure an object to be measured such as a ring gage with high accuracy.

Other Exemplary Embodiments

The present invention is not limited to the aforementioned exemplary embodiments, and these exemplary embodiments can be modified as appropriate without departing from the spirit and scope of the present invention.

Note that in the second exemplary embodiment, it is also possible to improve the accuracy in the first, second and third filters 201a, 201b and 201c even further by obtaining a transfer function for each of the predetermined positions in the X, Y and Z axis directions in advance and by using a transfer function corresponding to the slider position in the X, Y and Z axis directions as in the case of the first exemplary embodiment.

Further, in the choice of a transfer function, the transfer function may be selected for each of the predetermined positions on the individual X, Y, and Z axes. Alternatively, the transfer function may be selected for each of the 3D spatial positions that are determined by predetermined positions on the X, Y, and Z axes.

Although the above-described exemplary embodiments are explained by using example cases where a circle is scanning-measured, the present invention is not limited to this configuration. For example, the present invention can be applied to scanning measurement of a free-form surface and the like.

Further, the present invention can be implemented regardless of whether the scanning measurement is nominal scanning measurement in which the probe follows a predetermined path (design value) or autonomous scanning measurement (in which a measuring machine measures the surface shape of an object to be measured while estimating the surface shape in a step-by-step manner).

Further, although the above-described exemplary embodiments are explained exclusively with the coordinate measuring machine, the present invention is not limited to this configuration. That is, needless to say, the present invention can be also implemented for various measuring machines such as an image measuring machine, a contour measuring machine, a roundness measuring machine, and a surface roughness measuring machine in a similar manner. Further, although the above-described exemplary embodiments are explained exclusively with coordinate/shape measurement, the present invention is not limited to this configuration. That is, needless to say, the present invention can be also implemented for surface property measurement such as roundness measurement, contour measurement, and roughness/undulation measurement in a similar manner. Further, the present invention can be also implemented for a surface property measurement program in a similar manner.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A shape measuring machine comprising:
   a scanning probe that performs scanning measurement by using a tip sphere disposed at a tip of a stylus attached to one end of the scanning probe, the tip sphere being configured to come into contact with an object to be measured;
   a movably-disposed slider that supports the scanning probe at another end of the scanning probe opposite to the tip sphere;
   a scale unit that detects a displacement of the slider;
   a tip sphere displacement detection unit that detects a displacement of the tip sphere of the scanning probe with respect to a junction between the scanning probe and the slider; and
   a calculation unit that calculates a measurement value from the displacement of the slider detected by the scale unit and the displacement of the tip sphere detected by the tip sphere displacement detection unit,
   wherein the calculation unit comprises:
   a correction filter that outputs a correction value, the correction value being obtained by correcting the displacement of the tip sphere detected by the tip sphere displacement detection unit based on an inverse characteristic of a frequency transfer characteristic from the scale unit to the tip sphere; and
   an adder that calculates the measurement value by adding the displacement of the slider detected by the scale unit and the correction value.

2. The shape measuring machine according to claim 1, wherein the correction filter outputs the correction value, the correction value being obtained by correcting the displacement of the tip sphere detected by the tip sphere displacement detection unit based on an estimated value of the inverse characteristic of the frequency transfer characteristic from the scale unit to the tip sphere.

3. The shape measuring machine according to claim 2, wherein the correction filter comprises:
   a first filter that corrects the displacement of the tip sphere detected by the tip sphere displacement detection unit based on an estimated value of an inverse characteristic of a frequency transfer characteristic from the scale unit to the junction between the scanning probe and the slider;
   a second filter that corrects a value corrected by the first filter based on an estimated value of an inverse characteristic of a frequency transfer characteristic from the junction between the scanning probe and the slider to a stylus attachment part of the scanning probe; and
   a third filter that outputs a value as the correction value, the value being obtained by correcting a value corrected by the second filter based on an estimated value of an inverse characteristic of a frequency transfer characteristic from the stylus attachment part of the scanning probe to the tip sphere.

4. The shape measuring machine according to claim 2, wherein an estimated value of an inverse characteristic of a frequency transfer characteristic is calculated as a transfer function based on an actual measurement value of a frequency transfer characteristic or an inverse frequency transfer characteristic.

5. The shape measuring machine according to claim 1, further comprising a filter that removes an unnecessary frequency component contained in the correction value or the measurement value.

6. A method of correcting a shape measurement error comprising:
   detecting, by a scale unit, a displacement of a movably-disposed slider, the slider supporting a scanning probe that performs scanning measurement by using a tip sphere disposed at a tip of a stylus attached to one end of the scanning probe, the slider supporting the scanning probe at another end of the scanning probe opposite to the tip sphere, the tip sphere being configured to come into contact with an object to be measured;
   detecting a displacement of the tip sphere of the scanning probe with respect to a junction between the scanning probe and the slider;
   outputting a correction value, the correction value being obtained by correcting the detected displacement of the tip sphere based on an inverse characteristic of a frequency transfer characteristic from the scale unit to the tip sphere; and
   calculating a measurement value by adding the displacement of the slider detected by the scale unit and the correction value.

7. The method of correcting a shape measurement error according to claim 6, wherein the correction value is output, the correction value being obtained by correcting the detected displacement of the tip sphere based on an estimated value of the inverse characteristic of the frequency transfer characteristic from the scale unit to the tip sphere.

8. The method of correcting a shape measurement error according to claim 7, further comprising:
   calculating a first value by correcting the detected displacement of the tip sphere based on an estimated value of an inverse characteristic of a frequency transfer characteristic from the scale unit to the junction between the scanning probe and the slider;
   calculating a second value by correcting the first value based on an estimated value of an inverse characteristic of a frequency transfer characteristic from the junction between the scanning probe and the slider to a stylus attachment part of the scanning probe; and
   calculating the correction value by correcting the second value based on an estimated value of an inverse characteristic of a frequency transfer characteristic from the stylus attachment part of the scanning probe to the tip sphere.

9. The method of correcting a shape measurement error according to claim 7, wherein an estimated value of an inverse characteristic of a frequency transfer characteristic is calculated as a transfer function based on an actual measurement value of a frequency transfer characteristic or an inverse frequency transfer characteristic.

10. The method of correcting a shape measurement error according to claim 6, further comprising performing a filtering process for removing an unnecessary frequency component contained in the correction value or the measurement value.

* * * * *